(Model.)
F. T. MADDRIX.
OYSTER TONGS.
No. 448,059. Patented Mar. 10, 1891.
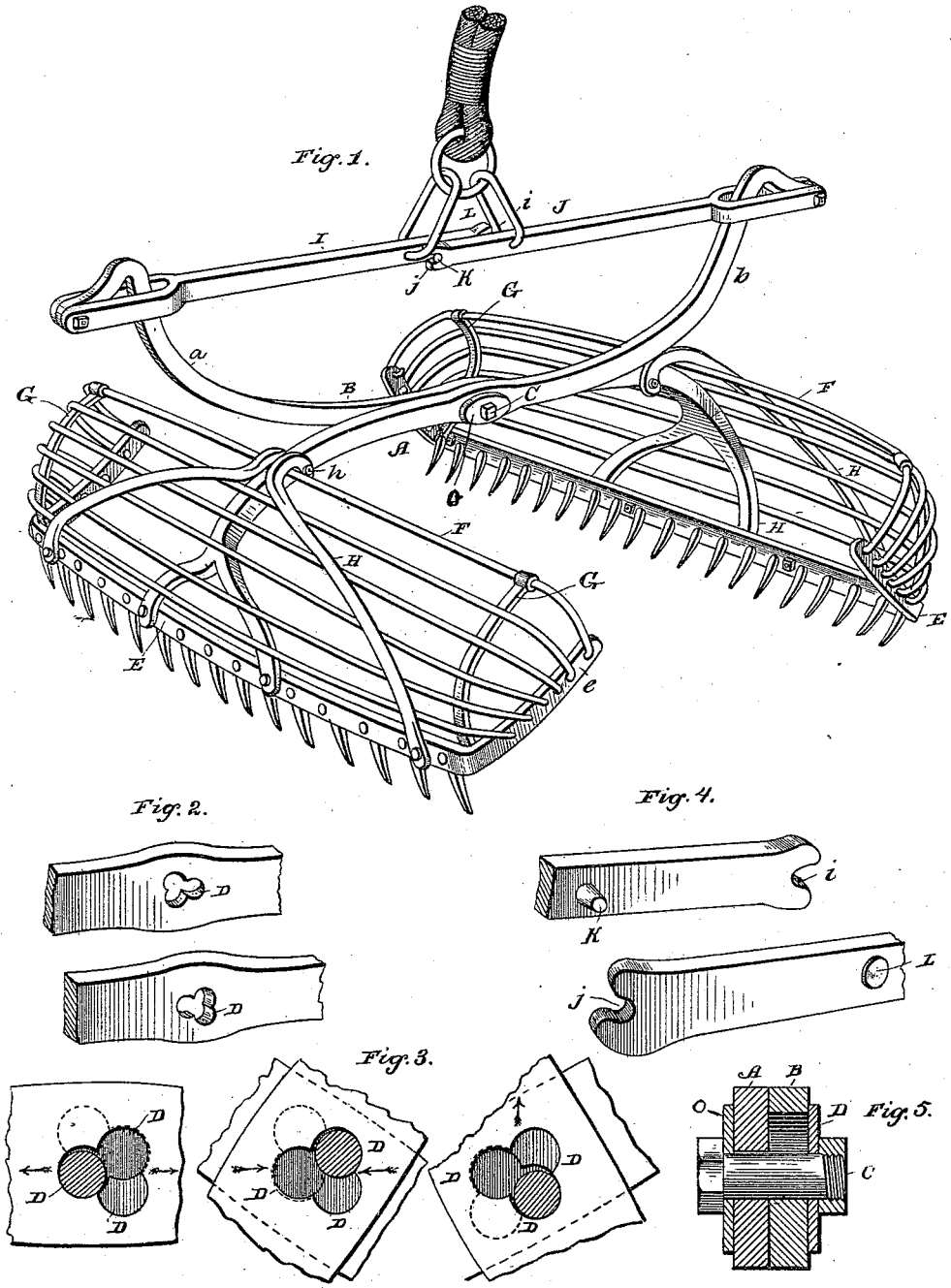
ATTEST.
Victor J. Evans.
Van Buren Hillyard.
INVENTOR.
Francis T. Maddrix.
By R. S. & A. Lacey
his Attys.

UNITED STATES PATENT OFFICE.

FRANCIS T. MADDRIX, OF CRISFIELD, MARYLAND.

OYSTER-TONGS.

SPECIFICATION forming part of Letters Patent No. 448,059, dated March 10, 1891.

Application filed March 14, 1890. Serial No. 343,905. (Model.)

*To all whom it may concern:*

Be it known that I, FRANCIS T. MADDRIX, a citizen of the United States, residing at Crisfield, in the county of Somerset and State of Maryland, have invented certain new and useful Improvements in Oyster-Tongs; and I do hereby declare the following to be a full, clear, and exact description of the invention, such as will enable others skilled in the art to which it appertains to make and use the same.

This invention relates to oyster-tongs, and has for its object to provide tongs that can be lowered without the usual rope and windlass, and in which the jaws will remain separated until the tongs strike the bed, when the pivotal connection between the levers will shift and effect a disengagement of the locking mechanism.

A further object of the invention lies in the peculiar construction of the jaws, which are braced to take the strain in every possible direction, the bars comprising the guard being embraced intermediate their ends between the levers and brace-bars especially provided for the purpose.

A still further object of the invention is to form the draft ends of the levers in such a manner that the up-hand on the lifting-rope will effectually close the jaws prior to any lifting of the tongs, and will retain the jaws in a closed position until the tongs are lifted and landed.

The improvement consists of the novel construction and combination of the parts which will be hereinafter more fully described and claimed, and which are shown in the accompanying drawings, in which—

Figure 1 is a perspective view of the invention, showing the jaws separated and locked ready for dropping overboard. Fig. 2 is a detail perspective view of the middle portion of the levers, showing them separated to illustrate better the pivot-openings therein. Figs. 3 are detail views showing the relative position of the pivot when the tongs are locked open, releasing and lifting, respectively. Fig. 4 is a detail perspective view of the locking ends of the lock-bars, said ends being separated.

A and B represent the levers, which are equipped at their lower ends with the jaws for gathering in the oysters and at their upper ends with the locking mechanism and draft devices. These levers are preferably of the form of an ogee in side elevation, their lower ends being forked and their upper ends having arms $a$ and $b$, respectively, which extend in opposite directions. These levers A and B cross and are connected together by a shifting pivot C, which is a bolt of ordinary construction. The openings D in the levers for the reception of the pivot is somewhat larger than the said pivot in cross-section, thereby permitting the latter to shift to adapt itself to the direction of the strain, which, for all practical purposes, assumes three directions, which are in when the jaws are locked open, out when the jaws are closing, and vertical when lifting the tongs. These three positions are clearly indicated in Figs. 3. The openings are trefoil in shape, each cusp thereof corresponding to one of the three directions of strain and adapted to receive the pivot and hold it in the required position, the cusp being of such shape as to snugly fit the pivot.

While the trefoil-shaped opening has been found to give the best results, and for that reason is the preferred form, other forms of openings may be used that will permit the shifting of the pivot to adapt itself to the change in direction of the strain.

The tooth-bars E have their ends $e$ bent up at right angles and slightly curved from the perpendicular, the guard-bars F being arranged in parallel series with the bent ends $e$. These ends $f$ are of graduated length to give shape and capacity to the jaws. The guard-bars are strengthened at each end by the braces G, which are secured at their lower ends to the tooth-bars and at their upper ends to the top guard-bar. The forked ends of the levers extend down on the inside of the guard-bars and are secured at their lower ends to the tooth-bars. The brace-bars H, placed exterior to the guard-bars F, are secured at their lower ends to the tooth-bars and at their upper ends to the levers. The upper ends of the brace-bars H are placed one on each side of the lever and are secured thereto by bolt $h$, and the braces diverge rapidly from said upper ends to their junction with the tooth-bars.

The locking-bars I and J, which are secured at their outer ends to the arms a and b of the levers A and B, respectively, have notches i and j in their respective ends and stops K and L at a short distance from said notched ends. The outer ends of the lock-bars are separated and the upper ends of the levers pass between the separated portions and have a pivotal connection therewith. The hoisting-rope N is applied to the ends of the lock-bars preferably by links m and n, as shown.

To prevent dirt getting in the pivot-openings in the levers, plates O, sufficiently large to close the said openings, are mounted on the pivot one on each exterior side of the levers. These plates also prevent the pivot from getting oblique or slanting in the pivot-openings.

The operation of the tongs is as follows: The jaws are separated sufficiently far to permit the notched ends of the lock-bars to engage with the stops thereon, thereby forming a stiff joint. A man at each end of the lock-bars lifts the tongs between them and throws them overboard. When the tongs reach the oyster-bed, the pivot shifts and effects a separating of the upper ends of the levers, which draws the notched ends of the lock-bars out of engagement with the said stops and unlocks the tongs. A pull on the hoisting-rope causes the jaws to close, and when the said jaws are effectually closed a continued pull on the rope lifts the tongs.

I make no claim, broadly, to the end guards projected from the face of the jaws; but I do lay claim to the special construction and formation of end guards as shown and set forth.

Having thus described my invention, what I claim, and desire to secure by Letters Patent, is—

1. A pair of oyster-tongs having the levers connected by an automatically-shifting pivot, substantially as and for the purpose described.

2. The combination, with the levers and a locking device to hold the jaws separated, of an automatically-shifting pivotal connection between the said levers, which will change its position and effect a disengagement of the said locking mechanism, substantially as set forth.

3. The combination, with the levers having the jaws at their lower ends and locking-bars at their upper ends, of a shifting pivot connecting the levers between their ends, substantially as and for the purpose described.

4. The combination, with the levers having jaws at their lower ends and having a trefoil opening at their pivotal point, of a pivot adapted to pass through said openings and connect the said levers together, substantially as and for the purpose described.

5. In oyster-tongs, the combination, with the levers pivotally connected together, of the locking-bars adapted to have their ends overlap and interlock, substantially as and for the purpose described.

6. In oyster-tongs, the combination, with the levers having jaws at their lower ends, of the locking-bars pivotally connected with the said levers and having notches in their inner ends and stops a short distance from the said notched ends to engage with the said notched ends and effect a locking of the said bars, substantially as set forth.

7. In oyster-tongs, the combination, with the levers having their upper ends bent outward at approximately right angles to form arms, of the locking-bars pivotally connected at their outer ends with the said arms and adapted to have their inner ends overlap and interlock, and the hoisting-rope having connections with the locking-arms near their inner ends, substantially as set forth.

8. In oyster-tongs, the herein-described jaw, comprising a tooth-bar having its ends bent up at right angles and guard-bars having their ends bent and secured to the bent ends of the tooth-bars, substantially as described.

9. In oyster-tongs, the herein-described jaw, comprising a toothed bar having its ends bent up and guard-bars having their ends bent and secured to the bent ends of the tooth-bar, the bent ends of the guard-bars being of graduated lengths, substantially as and for the purpose described.

10. In oyster-tongs, the herein-described jaw, comprising tooth and guard-bars, in combination with the lever and brace-bars H, which embrace the said guard-bars, the brace-bars being secured to the lever above the guard-bars and the lever and brace-bars being secured at their lower ends to the tooth-bar, substantially as set forth.

11. In oyster-tongs, the hereinbefore-specified jaw, comprising a toothed bar having its ends bent up, guard-bars arranged in parallel series with the toothed bar and having their ends bent and secured to the bent ends of the toothed bar, end brace-bars G, the lever having its lower end forked and secured to the tooth-bar, and the diverging braces H, embracing the guard-bars between them and the forked end of the lever, secured at their upper ends to the lever and at their lower ends to the tooth-bar, substantially as specified.

In testimony whereof I affix my signature in presence of two witnesses.

FRANCIS T. MADDRIX.

Witnesses:
ELMER R. GANDY,
JOHN H. MEARS.